(12) United States Patent
Thakur et al.

(10) Patent No.: US 9,767,182 B1
(45) Date of Patent: Sep. 19, 2017

(54) CLASSIFICATION OF SEARCH QUERIES

(71) Applicant: Searchmetrics GmbH, Berlin (DE)

(72) Inventors: Abhishek Thakur, Berlin (DE);
Marcus Tober, Berlin (DE)

(73) Assignee: SEARCHMETRICS GMBH, Berlin (DE)

( * ) Notice: Subject to any disclaimer, the term of this patent is extended or adjusted under 35 U.S.C. 154(b) by 0 days.

(21) Appl. No.: 15/337,163

(22) Filed: Oct. 28, 2016

(51) Int. Cl.
*G06F 15/18* (2006.01)
*G06F 17/30* (2006.01)
*G06N 99/00* (2010.01)

(52) U.S. Cl.
CPC .. *G06F 17/30598* (2013.01); *G06F 17/30507* (2013.01); *G06N 99/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,831,685 | B2* | 11/2010 | Dai | G06Q 30/02 709/217 |
| 8,041,733 | B2 | 10/2011 | Rouhani-Kalleh | |
| 8,302,030 | B2* | 10/2012 | Soroca | G06F 17/30749 705/14.45 |
| 8,364,540 | B2* | 1/2013 | Soroca | G06F 17/30035 705/14.64 |
| 8,768,960 | B2 | 7/2014 | Hu et al. | |
| 9,058,406 | B2* | 6/2015 | Soroca | G06Q 30/0247 |
| 2017/0068733 | A1* | 3/2017 | Tober | G06F 17/30864 |
| 2017/0091331 | A1* | 3/2017 | Tober | G06F 17/30867 |

FOREIGN PATENT DOCUMENTS

CN 104424296 A 3/2015

OTHER PUBLICATIONS

Similar image searching from image database using cluster mean sorting and performance estimation R. Venkata Ramana Chary; K. V. N Sunitha; D. Rajya Lakshmi 2012 International Conference on Machine Vision and Image Processing (MVIP) Year: 2012 pp. 9-12, DOI: 10.1109/MVIP.2012.6428748 IEEE Conference Publications.*

(Continued)

*Primary Examiner* — Michael B Holmes
(74) *Attorney, Agent, or Firm* — Millen, White, Zelano & Branigan, P.C.; William F. Nixon

(57) ABSTRACT

A computer-implemented method of classifying a search query in a network comprises: classifying a plurality of search queries into categories, comprising: applying predetermined rules to each of the plurality of search queries, wherein the predetermined rules are indicative of the categories and each of the plurality of search queries is associated with search results in the network; determining, for each of the plurality of search queries, similarity values indicating similarity to each of the categories based on the applied predetermined rules; and training a machine learning module, comprising: applying the machine learning module to a plurality of training sets to a plurality of training sets, wherein each of the plurality of training sets is based on one of the plurality of classified search queries and at least one of the respective one or more similarity values, a corresponding system, computing device and non-transitory computer-readable storage medium.

19 Claims, 10 Drawing Sheets

(56) References Cited

OTHER PUBLICATIONS

Modified rough set based aggregation for effective evaluation of web search systems Rashid Ali; M. M. Sufyan Beg NAFIPS 2009-2009 Annual Meeting of the North American Fuzzy Information Processing Society Year: 2009 pp. 1-6, DOI: 10.1109/NAFIPS.2009.5156415 IEEE Conference Publications.*

Extracting Relevant Attribute Values for Improved Search Sonia Bergamaschi; Claudio Sartori; Francesco Guerra; Mirko Orsini IEEE Internet Computing Year: 2007, vol. 11, Issue: 5 pp. 26-35, DOI: 10.1109/MIC.2007.105 IEEE Journals & Magazines.*

Image retrieval based on image mean mapping method R. Venkata Ramana Chary; D. Rajya Lakshmi; K. V. N Sunitha 2014 International Conference on Contemporary Computing and Informatics (IC3I) Year: 2014 pp. 377-382, DOI: 10.1109/IC3I.2014.7019803 IEEE Conference Publications.*

Bernard J. Jansen, Danielle L. Booth, Amanda Spink, Determining the User Intent of Web Search Engine Queries, WWW2007 / Poster Paper / Topic: Search, May 8-12, 2007, Banff, Alberta, Canada, pp. 1149-1150, ACM, 978-1-59593-654-7/07/0005.

* cited by examiner

CLASSIFICATION OF SEARCH QUERIES

BACKGROUND OF THE INVENTION

Field of the Invention

The invention relates to a method, system, computing device and storage medium for classifying search queries, i. e. tagging or labelling search queries with categories. More specifically, the invention relates to a method, system, computing device and storage medium for classifying search queries for resources in a network.

Background of the Invention

The World-Wide Web (www) comprises an indefinite number of webpages. Search engines crawl the webpages via the Internet and return, for user convenience, a list of webpages relevant to any particular search term, i. e. one or more keywords. Operators aiming to promote their webpages onto these lists of webpages create and optimize, using various techniques, their webpages for the search engines (search engine optimization, SEO). Recently, access to and usage of the World-Wide Web has moved from stationary personal computers to mobile computing devices, which adds another layer of complexity to search engine optimization.

Owing to the indefinite number of webpages and their ever changing contents, it is increasingly difficult to understand and match the users' search intention and/or buying cycle for a particular search query, and to get resources highly ranked by search engines in organic search results for relevant search queries.

Jansen Bernard J., Booth Danielle L., Spink Amanda, Determining the User Intent of Web Search Engine Queries, Proceedings of the 16$^{th}$ international conference on World Wide Web ACM, pp. 1149-1150, 2007, describes characteristics for naviganional searching, transactional search and informational searching categories.

The present invention overcomes present limitations and provides other advantages, as will become clearer to those skilled in the art from the present description.

BRIEF SUMMARY OF THE INVENTION

According to an aspect of an embodiment, a computer-implemented method of classifying a search query in a network may comprise: with a processing module, executing on one or more computing devices, automatically: classifying a plurality of search queries into two or more categories, comprising: applying one or more predetermined rules to each of the plurality of search queries, wherein the one or more predetermined rules are indicative of the two or more categories and each of the plurality of search queries is associated with one or more search results in the network; determining, for each of the plurality of search queries, one or more similarity values indicating similarity to each of the two or more categories based on the applied one or more predetermined rules; and with a training module, executing on one or more computing devices, automatically: training a machine learning module, comprising: applying the machine learning module to a plurality of training sets, wherein each of the plurality of training sets is based on one of the plurality of classified search queries and at least one of the respective one or more similarity values.

According to an aspect of another embodiment, in a method, the two or more categories may comprise at least one of: one or more main categories; and, more specifically, one or more user intent categories.

According to an aspect of another embodiment, in a method, the one or more user intent categories may comprise at least one of: an informational category; a navigational category; and a transactional category.

According to an aspect of another embodiment, in a method, the one or more predetermined rules may comprise at least one of: one or more informational rules; one or more navigational rules; and one or more transactional rules.

According to an aspect of another embodiment, in a method, the one or more informational rules may comprise at least one of: query comprises one or more question words; query comprises one or more natural language terms; query comprises one or more informational terms; query is subsequent query; query resulted in viewing of more than one search result; query comprises more than two terms; and query that does not match navigational rule or transactional rule.

According to an aspect of another embodiment, in a method, the one or more navigational rules may comprise at least one of: query comprises name, company name, business name, organization name or personal name; query comprises one or more domain suffixes; query with "web" as the source; query comprises less than three terms; and query resulted in viewing of first search engine results page.

According to an aspect of another embodiment, in a method, the one or more transactional rules may comprise at least one of: query comprises one or more terms relating to at least one of movies, songs, lyrics, recipes, images, humor and porn; query comprises one or more terms relating to obtainment; query comprises one or more terms relating to download; query relates to at least one of an image collection, and audio collection or a video collection; query with "audio", "images", or "video" as the source; query comprises one or more terms relating to entertainment; query comprises one or more terms relating to at least one of interaction, buying and chatting; query comprises one or more terms relating to movies, songs, lyrics, images; and query comprises at least one of multimedia file extension and compression file extension.

According to an aspect of another embodiment, in a method, the two or more categories may comprise at least one of: one or more sub categories; and, more specifically, one or more buying cycle categories.

According to an aspect of another embodiment, in a method, the one or more buying cycle categories may comprise at least one of: an awareness category; a consideration category; a purchase category; and a retention category.

According to an aspect of another embodiment, in a method, the one or more search results of each of the plurality of search queries may comprise at least one of: one or more titles of one or more resources; one or more identifiers to one or more resources; and one or more integrations supplemented to the one or more search results.

According to an aspect of another embodiment, in a method, the at least one of the respective one or more similarity values may be a highest similarity value within the one or more similarity values.

According to an aspect of another embodiment, in a method, the machine learning module may comprise at least one of a deep-learning model such as neural network, like deep neural network or convolutional neural network (CNN), linear model and generalized boosted model (GBM).

According to an aspect of another embodiment, a method may further comprise: with a search results module, executing on one or more computing devices, automatically:

obtaining, from the network, the one or more search results for each of the plurality of search queries; and storing the one or more search results of each of the plurality of search queries.

According to an aspect of another embodiment, a method may further comprise: with the processing module, prior to classifying the plurality of search queries into the two or more categories, automatically: modifying at least one of the plurality of search queries by deleting a term, word, filler word, nuisance word or stopword; modifying at least one of the plurality of search queries by replacing a term with a modified term or basic term corresponding to the term; processing one or more titles of one or more resources; or processing one or more identifiers to one or more resources.

According to an aspect of another embodiment, in a method, each of the plurality of training sets may comprise: a plurality of numbers; or a vector.

According to an aspect of another embodiment, a method may further comprise: with the training module, prior to training the machine learning module, automatically: converting the plurality of classified search queries and the at least one of the respective one or more similarity values into the plurality of training sets.

According to an aspect of another embodiment, a method may further comprise: with a classification module, executing on one or more computing devices, automatically: classifying the search query into a category of the two or more categories, comprising: applying the trained machine learning module to the search query; and obtaining the category classifying the search query from the trained machine learning module.

According to an aspect of yet another embodiment, a system for classifying a search query may comprise: one or more processors, when executing on one or more computing devices, being suitable for performing operation, and the operations may comprise: classifying a plurality of search queries into two or more categories, comprising: applying one or more predetermined rules to each of the plurality of search queries, wherein the one or more predetermined rules are indicative of the two or more categories and each of the plurality of search queries is associated with one or more search results in the network; determining, for each of the plurality of search queries, one or more similarity values indicating similarity to each of the two or more categories based on the applied one or more predetermined rules; and training a machine learning module, comprising: applying the machine learning module to a plurality of training sets, wherein each of the plurality of training sets is based on one of the plurality of classified search queries and at least one of the respective one or more similarity values.

According to an aspect of yet another embodiment, a computing device for classifying a search query may comprise: one or more processors, configured to perform operations; and a memory, coupled to the one or more processors and comprising instructions to cause, when executing on the one or more processors, the computing device to perform operations, comprising: classifying a plurality of search queries into two or more categories, comprising: applying one or more predetermined rules to each of the plurality of search queries, wherein the one or more predetermined rules are indicative of the two or more categories and each of the plurality of search queries is associated with one or more search results in the network; determining, for each of the plurality of search queries, one or more similarity values indicating similarity to each of the two or more categories based on the applied one or more predetermined rules; training a machine learning module, comprising: applying the machine learning module to a plurality of training sets, wherein each of the plurality of training sets is based on one of the plurality of classified search queries and at least one of the respective one or more similarity values.

According to an aspect of another embodiment, in a computing device, the two or more categories may comprise at least one of: one or more main categories; and, more specifically, one or more user intent categories.

According to an aspect of another embodiment, in a computing device, the one or more user intent categories may comprise at least one of: an informational category; a navigational category; and a transactional category.

According to an aspect of another embodiment, in a computing device, the one or more predetermined rules comprise at least one of: one or more informational rules; one or more navigational rules; and one or more transactional rules.

According to an aspect of another embodiment, in a computing device, the one or more informational rules comprise at least one of: query comprises one or more question words; query comprises one or more natural language terms; query comprises one or more informational terms; query is subsequent query; query resulted in viewing of more than one search result; query comprises more than two terms; and query that does not match navigational rule or transactional rule.

According to an aspect of another embodiment, in a computing device, the one or more navigational rules may comprise at least one of: query comprises name, company name, business name, organization name or personal name; query comprises one or more domain suffixes; query with "web" as the source; query comprises less than three terms; and query resulted in viewing of first search engine results page.

According to an aspect of another embodiment, in a computing device, the one or more transactional rules may comprise at least one of: query comprises one or more terms relating to at least one of movies, songs, lyrics, recipes, images, humor and porn; query comprises one or more terms relating to obtainment; query comprises one or more terms relating to download; query relates to at least one of an image collection, and audio collection or a video collection; query with "audio", "images", or "video" as the source; query comprises one or more terms relating to entertainment; query comprises one or more terms relating to at least one of interaction, buying and chatting; query comprises one or more terms relating to movies, songs, lyrics, images; and query comprises at least one of multimedia file extension and compression file extension.

According to an aspect of another embodiment, in a computing device, the two or more categories may comprise at least one of: one or more sub categories; and, more specifically, one or more buying cycle categories.

According to an aspect of another embodiment, in a computing device, the one or more buying cycle categories may comprise at least one of: an awareness category; a consideration category; a purchase category; and a retention category.

According to an aspect of another embodiment, in a computing device, the one or more search results of each of the plurality of search queries may comprise at least one of: one or more titles of one or more resources; one or more identifiers to one or more resources; and one or more integrations supplemented to the one or more search results.

According to an aspect of another embodiment, in a computing device, the at least one of the respective one or more similarity values may be a highest similarity value within the one or more similarity values.

According to an aspect of another embodiment, in a computing device, the machine learning module may comprise at least one of a deep-learning model such as neural network, like deep neural network or convolutional neural network, linear model and generalized boosted model.

According to an aspect of another embodiment, in a computing device, the memory may further comprise instructions to cause the computing device to perform further operations, comprising: obtaining, from the network, the one or more search results for each of the plurality of search queries; and storing the one or more search results of each of the plurality of search queries.

According to an aspect of another embodiment, in a computing device, the memory may further comprise instructions to cause the computing device to perform further operations, comprising: modifying at least one of the plurality of search queries by deleting a term, word, filler word, nuisance word or stopword; modifying at least one of the plurality of search queries by replacing a term with a modified term or basic term corresponding to the term; processing one or more titles of one or more resources; or processing one or more identifiers to one or more resources.

According to an aspect of another embodiment, in a computing device, each of the plurality of training sets may comprise: a plurality of numbers; or a vector.

According to an aspect of another embodiment, in a computing device, the memory may further comprise instructions to cause the computing device to perform further operations, comprising: converting the plurality of classified search queries and the at least one of the respective one or more similarity values into the plurality of training sets.

According to an aspect of another embodiment, in a computing device, the memory may further comprise instructions to cause the computing device to perform further operations, comprising: classifying the search query into a category of the two or more categories, comprising: applying the trained machine learning module to the search query; and obtaining the category classifying the search query from the trained machine learning module.

According to an aspect of yet another embodiment, a non-transitory computer-readable storage medium may comprise instructions causing a system to perform operations for classifying a search query, and the operations may comprise: classifying a plurality of search queries into two or more categories, comprising: applying one or more predetermined rules to each of the plurality of search queries, wherein the one or more predetermined rules are indicative of the two or more categories and each of the plurality of search queries is associated with one or more search results in the network; determining, for each of the plurality of search queries, one or more similarity values indicating similarity to each of the two or more categories based on the applied one or more predetermined rules; and training a machine learning module, comprising: applying the machine learning module to a plurality of training sets, wherein each of the plurality of training sets is based on one of the plurality of classified search queries and at least one of the respective one or more similarity values.

Classifying keywords and search queries are challenges particular to the Internet. The present invention can enable a user, for example an operator of a large number of resources such as webpages, to control classification of keywords and search queries. Thus, the present invention can enable the user to cope with the classification of the keywords and search queries although technical, administrative or financial means may be limited. Further, the present invention can enable the user to concentrate on particular keywords and search queries within a large body of keywords and search queries having best prospects. Furthermore, the present invention can enable the user to save time and/or to reduce costs.

The object and advantages of the embodiments will be realized and achieved at least by steps, elements, features and combinations defined in the claims. Thus, this brief summary and the following detailed description are exemplary and explanatory, and are not restrictive of the invention as defined in the claims.

BRIEF DESCRIPTION OF THE SEVERAL VIEWS OF THE DRAWING

The enclosed drawing depicts various aspects of some embodiments, and is not restrictive of the invention as defined in the claims:

DETAILED DESCRIPTION OF THE INVENTION

Figure 1:
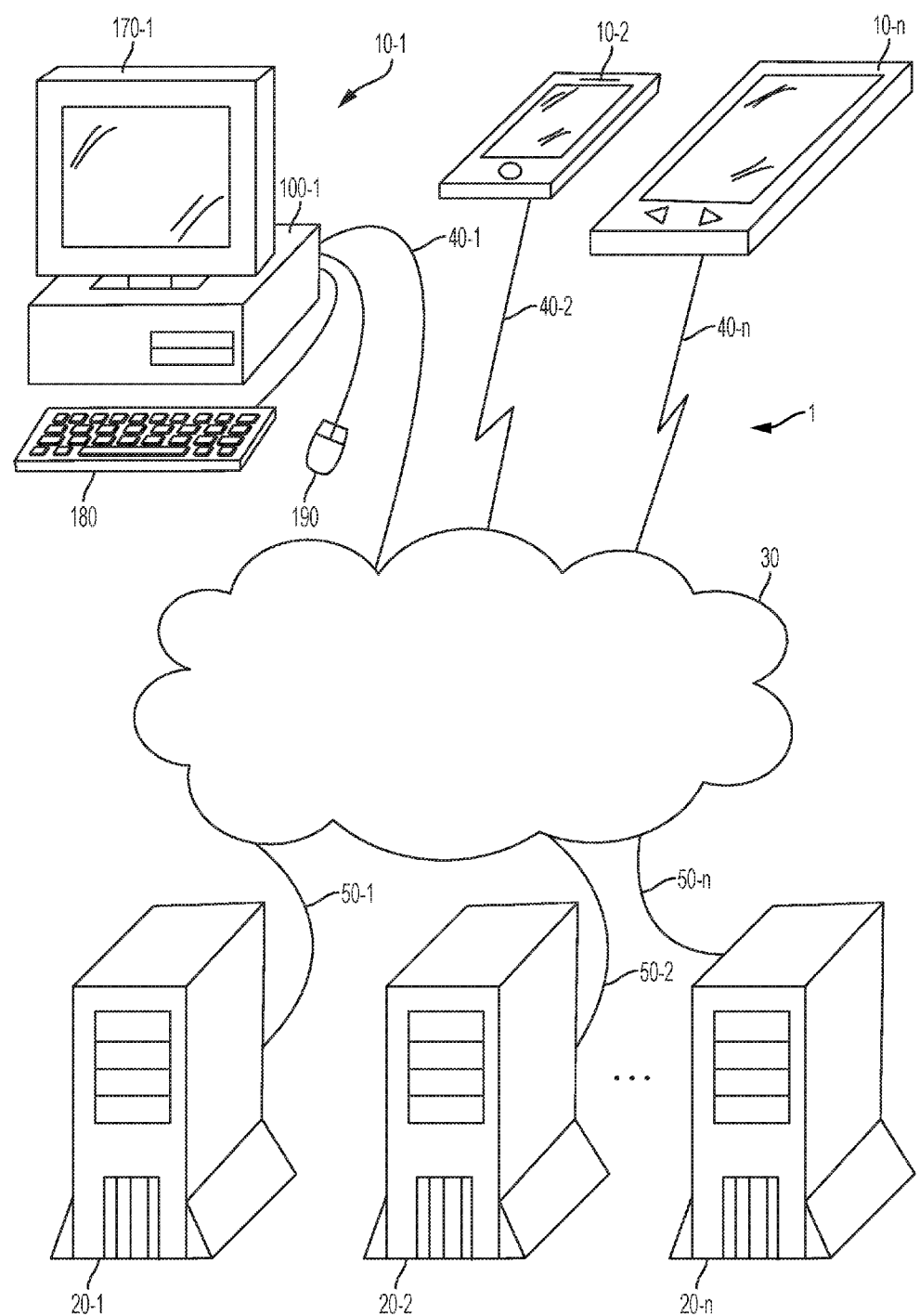
FIG. 1 shows a typical computer network architecture 1 implementing the present invention.

A preferred embodiment of the invention is now described in detail. Referring to the drawing, like reference numbers indicate like parts throughout the views. The drawing shows diagrammatic and schematic representations of some embodiments, is not necessarily drawn to scale, and is not restrictive of the invention. As used in the description and claims, the meaning of "a", "an" and "the" includes plural reference unless the context clearly dictates otherwise.

As used herein, the term "computer network" generally refers to a plurality of interconnected computing devices such as desktop computers, laptop computers, mobile devices like tablet computers, smart phones and smart watches, and servers, interconnected directly or, via network devices such as hubs, routers, switches and gateways, indirectly, for example the Internet. The computer network may comprise wire-based or wireless connections, or both.

As used herein, the term "resource" generally refers to an information source, for example a document such as a static document like hypertext markup language (html) document or dynamically generated document like PHP: Hypertext Preprocessor (php) document, or a software application, such as a software application for a mobile device (mobile app, app), located in one or more computing devices and being accessible, using an identifier of the resource, via the computer network. The term "target resource" generally refers to a resource under test, whereas the term "field resource" generally refers to a resource serving as reference.

As used herein, the term "universal resource locator (URL)" generally refers to an identifier to the resource, specifying its location on the computer network and a mechanism for retrieving it.

As used herein, the term "page" generally refers to a single-page resource. Pages may have different lengths.

As used herein, the term "webpage" generally refers to a page in the World-Wide Web (www).

As used herein, the term "resource contents" generally refers to contents of a resource. The contents may comprise a resource title and a resource corpus. The contents may be comprised of at least one of textual contents, graphical contents, imagery contents, audio contents, and video contents, for example. The resource contents may be intended for a particular market. The market may be defined by a given country and/or given language.

As used herein, the term "site" generally refers a plurality of pages accessible via a common domain or subdomain name. Sites are typically operated by companies, governments, organizations, and private individuals, for example. The term target site generally refers to a site under test, whereas the term field site generally refers to a site serving as reference.

As used herein, the term "website" generally refers to a site in the World-Wide Web.

As used herein, the term "network" generally refers to a plurality of resources made available to users via a computer network. The World-Wide Web, for example, is a network.

As used herein, the term "natural language" refers generally to a human written or spoken language, as opposed to a computer language, and/or more specifically to a language evolving naturally as a means of communication among people, as opposed to an artificial language or a formal language.

As used herein, the term "question word" generally refers to a word introducing a group of words, such as a sentence, in an interrogative form, addressed to someone or something in order to get information in reply. Questions words comprise, in English, "what", "when", "where", "why", "who", "whose", "which", "how", "how much" and "how many", and in German "was", "wann", "wo", "wohin", "warum", "wer", "wessen", "welche", "welcher", "welches", "wie", "wieviel" and "wieviele", for example.

As used herein, the term "keyword" generally refers to a term capturing the essence of a topic of interest or topic of a resource. The keyword may, for example, comprise a word or compound word. The term "commercial keyword" generally refers to a type of keyword having a high probability of bringing prospect customers to a page or site. The term "transactional keyword" generally refers to a type of keyword, like "buy" and "subscribe", having a high probability of bringing determined customers to a page or site. Based on user intention, transactional keywords may be further classified into subcategories, or "buying cycle categories", comprising "awareness", "consideration" (or "evaluation"), "purchase" (or "decision") and "retention". The term "informational keyword" generally refers to a type of keyword, like a question word such as "what" or "how", indicating search for information and having a low probability of generating revenue. The term "navigational keyword" generally refers to a type of keyword, like a company or brand name, indicating a navigational search for merely finding the page or site of this company or product.

As used herein, the term "topic cluster" generally refers to a cluster of similar keywords. The name of a topic cluster may result from the most frequent keyword in a cluster of similar keywords.

As used herein, the term "topic graph" refers to a representation, wherein each topic is represented by a node comprising one or more properties of the topic.

As used herein, the term "category" generally refers to a class or group of similar or related items such as resources or keywords relating to a particular topic. A set of categories comprises a plurality of categories. The set of categories may be a partially ordered set (poset) or graph such as tree. The tree may have a plurality of related categories, one of which being a root category. Any category including the root category may have one or more child categories, or subcategories, and, thus, be designated "parent category". If its one or more child categories have one or more child categories themselves, it may also be designated "ancestor category". Any category excluding the root category may have one or more parent categories and, thus, be designated "child category". If its one or more parent categories have one or more parent categories themselves, it may also be designated "descendent category". Categories having the same parent category may be designated "sibling categories". Any resource or keyword may be placed in two or more categories comprising resources or keywords relating to the same topic. The free online encyclopedia Wikipedia.org, enabling its users to contribute and consume information, and further Wikimedia projects use the free collaboratively edited knowledge base Wikidata.org as a common source of data. In Wikipedia, articles are placed in two or more categories, and all categories are organized as overlapping trees, formed by creating links between inter-related categories.

As used herein, the term "term frequency—inverse document frequency", or "tf-idf" for short, is a numerical statistic intended to reflect importance of a particular term in a corpus of text or collection of documents. It is a function, such a product, of two statistics: term frequency and inverse document frequency: The term "term frequency" (tf) refers to the number of occurrences of the particular term in a document; wherein the weight of the term in a particular document is proportional to its term frequency. The term "inverse document frequency" (idf) refers an inverse of the number of all documents wherein the particular term occurs, thus, quantifying specificity of the term: wherein weights of very frequently occurring terms such as common terms, for example "a", "the", "is" and "and", are diminished, and, thus, weights of rarely occurring terms are increased.

As used herein, the term "Word2Vec" generally refers to distinct models, comprising the continuous bag-of-words (CBOW) model and the continuous skip-gram model, for producing word embeddings in natural language processing (NLP) by taking a large corpus of text as input and producing a high-dimensional space wherein each unique word in the corpus is assigned to a corresponding word vector in the space. The word vectors are positioned in the space such that words that share common contexts in the corpus are located in close proximity to one another in the space. The models may be implemented by shallow, two-layer neural networks trained to reconstruct linguistic contexts of words.

As used herein, the term "t-distributed stochastic neighbor embedding", or t-SNE for short, generally refers to algorithms for nonlinear dimensionality reduction, or dimension reduction, by reducing a number of variables under consideration via obtaining a set of principal variables. The algorithms may be used for embedding high-dimensional data into a two-dimensional or three-dimensional space, and visualizing the data in a scatter plot.

As used herein, the term "cosine similarity" refers to a measure of similarity between two non-zero vectors of an inner-product space that measures the cosine of the angle between the vectors. For an angle of 0° the cosine is 1, and for any other angle it is less than 1. Thus, it is a judgment of orientation and not magnitude: two vectors with the same orientation have a cosine similarity of 1, two vectors at 90° have a similarity of 0, and two vectors diametrically opposed have a similarity of −1, independent of their magnitudes.

As used herein, the term "long short-term memory", or "LSTM" for short, refers is a particular recurrent neural network (RNN) architecture. Like most RNNs, an LSTM may, given enough network units and a proper weight matrix, compute anything a conventional computer can compute. However, unlike traditional RNNs, an LSTM may be well-suited to learn from experience for classifying, processing and predicting time series with very long time lags of unknown size between important events. Moreover, deep neural networks comprise a larger number of node layers through which data passes in a multistep pattern recognition process; each node layer trains on a distinct set of features based on the output from node layer preceding it. Thus, as subsequent node layers aggregate and recombine features from the precding node layers, they can recognize more complex features.

As used herein, the term "organic search" generally refers to searching, in response to a query comprising one or more keywords (keyword query), relevant information. A search usually comprises adding attribution information, then filtering it, and then sorting it. Search algorithms comprise the CheiRank (sorting) algorithm and PageRank (sorting) algorithm. Search algorithms may analyse and/or exploit user behavior, for example length of stay on and return rate from a search result. The results of the organic search are generally ranked by relevance to the query.

As used herein, the term "search engine" generally refers to a software application for searching information on a network using organic search. Search engines include Google.com, Baidu.com and Yandex.com.

As used herein, the term "crawler" generally refers to a software application executable on a computing device for systematically browsing a network, typically for indexing sites for a search engine.

As used herein, the term "browser" generally refers to a software application executable on a computing device for enabling a computer user to navigate, or surf, a network.

As used herein, the term "search engine results page(s) (SERP(s))" generally refers to one or more pages generated by a search engine in response to a query received from a user via a computing device, returned to the computer device and displaying the ranked results in a browser on the computing device. In addition to results of the organic search, the pages typically further comprise sponsored results, i. e. advertisements relating to the query and paid for by advertisers (keyword advertising).

As used herein, the term "search engine marketing (SEM)" generally refers to marketing on search engine results pages, like keyword advertising.

As used herein, the term "conversion" generally refers to a user decision resulting in an operator-intended or marketing-intended action, such as a transaction, e. g. purchase.

As used herein, the term "cost per click (CPC)" refers to the cost in pay-per-click (PPC) marketing, a type of paid marketing where the advertiser has to pay to the affiliate when the user follows a link in the advertiser's advertisement. The advertisement may be one of the sponsored results, for example.

As used herein, the term "social network" generally refers to a network, like Facebook.com and Twitter.com, enabling its users to upload and consume, hence, share contents like messages, audio contents or video contents. Users may provide feedback on the contents by posting comments and sending social signals, like Facebook's Likes.

As used herein, the term "social media marketing (SMM)" generally refers to marketing on social networks, like viral videos.

As used herein, the term "marketplace" generally refers to a network, like Amazon.com and Tmall.com, offering products and services for rent or sale. Typically, a marketplace comprises a plurality of resources, each of which being dedicated to one or more products or services. Thus, a marketplace, for example, may comprise hundreds, thousands or millions of resources.

As used herein, the term "video platform" generally refers to a network, like Youtube.com and Vimeo.com, enabling its users to upload and consume, and, hence, share video contents.

As used herein, the term "app store" generally refers to a network, like Apple's iTunes App Store and Google's Play Store, enabling developers to distribute their software applications for computer devices, for example mobile apps.

As used herein, the term "link building" generally refers to methods aiming to increase the number and quality links on pages pointing to the page or site.

As used herein, the term "search engine optimization (SEO)" generally refers to methods aiming to improve the position of a page or site in the ranked results. The methods include direct on-page optimization amending the page or site itself, and indirect off-page optimization including link building, search engine marketing, social media marketing.

As used herein, the term "contextual network", or content network, generally refers to a subnetwork of related resources in a network, the subnetwork providing services, like search engines, or contents, like social networks, marketplaces, video platforms and app stores. Typically, contextual networks, like Google AdWords and Facebook Ads, place context-specific advertisement across their pages.

As used herein, the term "performance" generally refers to a network-specific resource and its utility, usefulness and, hence, score and ranking. The performance of a target resource may be represented relative to the performance of a field resource.

As used herein, the term "performance metrics" generally refers to a network-specific resource and its metrics. The term keyword-related performance metrics generally refers to a metrics relating to a keyword, like search volume of the keyword and cost-per-click of the keyword. The term traffic-related performance metrics generally refers to a metrics relating to traffic, like traffic volume of the resource and traffic speed of the resource. The term context-related performance metrics generally refers to a metrics relating to a contextual network, like volume of social signals.

As used herein, the term "performance potential", or "potential performance", generally refers to a network-specific resource and its ability to increase its utility and usefulness, and to climb in scores and rankings. Thus, a resource being already at the top of a ranking or most popular has no potential to climb further. The performance potential of a target resource may be represented relative to the performance of a field resource.

For classifying search queries in a network such as the www, a computer such as a server computer coupled to the network may comprise a processor such as microprocessor, configured to perform operations; and a memory such as main memory, coupled to the processor and comprising instructions such as machine instructions. The instructions, when executed in the computer, i. e. by the processor, may cause the operations of crawling the network and acquiring contents from the resources in the network; determining performance metrics, such as keywords, search volumes of the keywords, costs-per-click of the keywords, traffics volumes of the resources, traffic speeds of the resources, context-related performance metrics relating contextual networks such as social networks like Facebook.com and marketplace like Amazon.com, volumes of social signals of the resources, numbers of backlinks to the resources, ratings of the resources, search-engine-optimization values of the resources, and bounce rates and click-through rates, characterizing the resources; and storing the performance metrics in the memory, for example in a data base in the memory.

For classifying search queries in a network such as the www, a computer such as a server computer coupled to the network may comprise a processor such as microprocessor, configured to perform operations; and a memory such as main memory, coupled to the processor and comprising instructions such as machine instructions. The instructions, when executed in the computer, i. e. by the processor, may cause the operations of receiving, for example from a user via a web browser on another computer such as client computer, one or more received topics for resource contents, determining, using the pre-stored performance metrics, one or more candidate topics related to the one or more received topics for the resource contents; in case that one or more topics selectable from the one or more candidate topics, or added from one or more additional topics are received, returning to determining one or more candidate topics; determining, using the pre-stored performance metrics, one or more candidate questions relevant to at least one of the one or more received topics; and receiving one or more questions selectable from the one or more candidate questions; determining, using the pre-stored performance metrics, one or more candidate terms relevant to at least one of the one or more received topics, and one or more received questions; receiving one or more terms selectable from the one or more candidate terms; determining, using the pre-stored performance metrics, a candidate target quantity value for the resource contents based on at least one of the one or more received topics, one or more received questions, and one or more received terms; and generating a brief for the resource contents based on at least one of the one or more received topics, one or more received questions, and one or more received terms.

The instructions may cause the operations of outputting the performance metrics. The performance metrics may be suitably represented, for example, as bar graphs, pie charts, bubble charts, traffic-light rating like red amber green (RAG) rating or any combination thereof. The output may be presented to the user via the web browser on the other computer.

The instructions may cause the operations of classifying the search queries. The search queries may be classified automatically, semi-automatically or manually.

FIG. 1 shows a typical computer network architecture 1 implementing the present invention. The typical computer network architecture 1 may comprise a plurality of client computing devices 10-1, . . . 10-n, a plurality of server computing devices 20-1, . . . 20-n and a network 30 such as the Internet.

The plurality of client computing devices 10-1, . . . 10-n may comprise one or more stationary computing devices 10-1. One or more of the stationary computing devices 10-1 may, for example, comprise a desktop computer 100-1, a display 170-1 coupled to the desktop computer 100-1, an input device 180 such as a keyboard coupled to the desktop computer 100-1 and a pointing device 190 such as a mouse 190, joystick, trackball and touchpad coupled to the desktop computer 100-1. One or more of the stationary computing devices 10-1 may be coupled to the network 30 via a connection such as wire-based connection 40-1. The plurality of client computing devices 10-1, . . . 10-n may comprise one or more mobile computing devices 10-2, . . . 100-n such as a smart phone 10-2 or a tablet computer 10-n. One or more of the mobile computing devices 10-2, . . . 10-n may be coupled to the network 30 via a connection such as wireless connection 40-1, 40-n. The client computing devices 10-1, . . . 10-n may, for example, be implemented by a typical computer device architecture 10 as described with reference to FIG. 2.

The plurality of server computing devices 20-1, . . . 20-n may, for example, comprise one or more tower servers, one or more rack servers, or any combination thereof. One or more of the plurality of server computing devices 20-1, . . . 20-n may be coupled to the network 30 via a connection such as wire-based connection 50-1, . . . 50-n. The server computing devices 20-1, . . . 20-n may, for example, be implemented by a typical computer device architecture 10 as described with reference to FIG. 2.

The network 30 may comprise one or more hubs, switches, routers and the like. Thus, users of the plurality of client computing devices 10-1, . . . 10-n may, for example, access software such as data or programs stored in plurality of server computing devices 20-1, . . . 20-n via the network 30.

Figure 2:
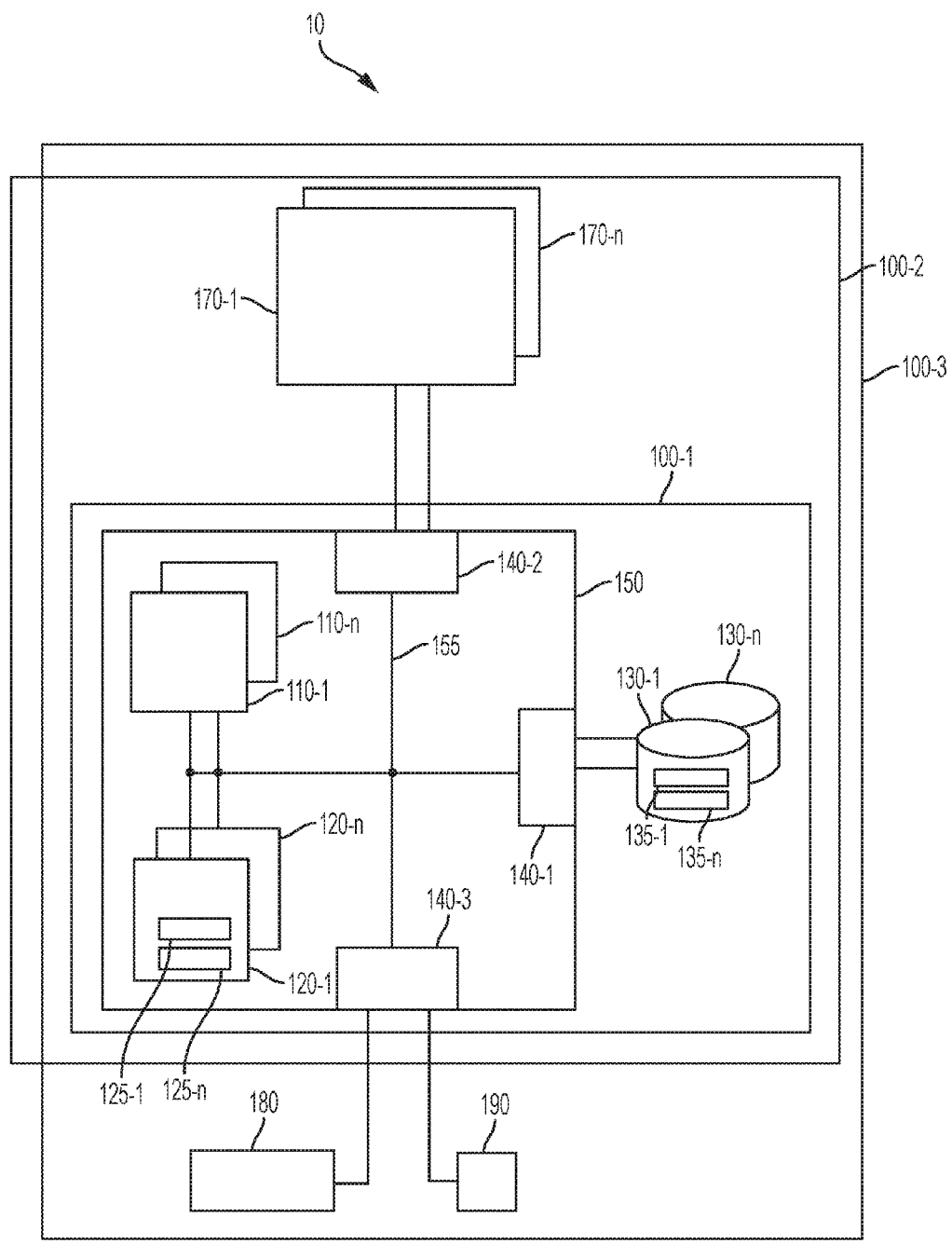
FIG. 2 shows a typical computer device architecture 10 implementing the present invention.

FIG. 2 shows a typical computer device architecture 10 implementing the present invention. The typical computer device architecture 10 may comprise one or more processors 110-1, . . . 110-n, one or more memories 120-1, . . . 120-n coupled to the one or more processors 110-1, . . . 110-n, and one or more interfaces 140-1, . . . 140-3 coupled to the one or more processors 110-1, . . . 110-n.

The one or more processors 110-1, . . . 110-n may execute instructions of programs, for example, comprise a microprocessor, an application-specific integrated circuit (ASIC), an application-specific instruction set processor (ASIP), a digital signal processor (DSP), a co-processor, or any combination thereof. The one or more processors 110-1, . . . 110-n may, for example, comprise a single-core processor, multi-core processor such as quad-core processor, or any combination thereof. The one or more processors 110-1, . . . 110-n may, for example, be implemented by microcontrollers or field programmable gate arrays (FPGAs).

The one or more memories 120-1, . . . 120-n may store software items 125-1, . . . 125-n such as data or programs likes databases and, for example, comprise volatile memory such as random-access memory (RAM) and static RAM (SRAM), non-volatile memory such as read-only memory (ROM), electrically erasable programmable ROM (EEPROM) and Flash memory, or any combination thereof. The one or more interfaces 140-1, . . . 140-3 may, for example, comprise parallel interfaces, serial interfaces, universal serial bus (USB) interfaces, or any combination thereof.

The one or more processors 110-1, . . . 110-$n$, one or more memories 120-1, . . . 120-$n$ and one or more interfaces 140-1, . . . 140-3 may be arranged on a circuit board such as printed circuit board (PCB) 150 comprising connections such as a bus 155 coupling the one or more processors 110-1, . . . 110-$n$, one or more memories 120-1, . . . 120-$n$ and one or more interfaces 140-1, . . . 140-3.

The typical computer device architecture 10 may comprise one or more data storages 130-1, . . . 130-$n$ such as hard disk drives (HDDs, hard disks, hard drives), solid-state drives (SSDs), Compact Disc ROM (CD-ROM) drives, or any combination thereof. The one or more data storages 130-1, . . . 130-$n$ may store software items 135-1, . . . 135-$n$ such as data or programs likes databases. The one or more data storages 130-1, . . . 130-$n$ may, for example, comprise fixed data storages, removable data storages, or any combination thereof. The one or more data storages 130-1, . . . 130-$n$ may be coupled to the one or more processors 110-1, . . . 110-$n$ via a storage interface 140-1 of the one or more interfaces 140-1, . . . 140-3.

The typical computer device architecture 10 may comprise one or more displays 170-1, . . . 170-$n$ such as cathode ray tube (CRT) displays, liquid-crystal displays (LCDs), organic light-emitting diode (OLED) displays, or any combination thereof. The one or more data storages 170-1, . . . 170-$n$ may be coupled to the one or more processors 110-1, . . . 110-$n$ via a display interface 140-2 of the one or more interfaces 140-1, . . . 140-3.

The typical computer device architecture 10 may comprise an input device 180 such as a keyboard coupled to the one or more processors 110-1, . . . 110-$n$ via a input interface 140-3 of the one or more interfaces 140-1, . . . 140-3. The typical computer device architecture 10 may comprise a pointing device 190 such as a mouse, joystick, trackball and touchpad coupled to the one or more processors 110-1, . . . 110-$n$ via the input interface 140-3.

The desktop computer 100-1, for example, may comprise the one or more processors 110-1, . . . 110-$n$, one or more memories 120-1, . . . 120-$n$, one or more interfaces 140-1, . . . 140-3, PCB 150 and one or more data storages 130-1, . . . 130-$n$. An all-in-one computer 100-2, for example, may comprise the one or more processors 110-1, . . . 110-$n$, one or more memories 120-1, . . . 120-$n$, one or more interfaces 140-1, . . . 140-3, PCB 150, one or more data storages 130-1, . . . 130-$n$ and one or more displays 170-1, . . . 170-$n$. A notebook computer 100-3, for example, may comprise the one or more processors 110-1, . . . 110-$n$, one or more memories 120-1, . . . 120-$n$, one or more interfaces 140-1, . . . 140-3, PCB 150, one or more data storages 130-1, . . . 130-$n$, one or more displays 170-1, . . . 170-$n$, input device 180 and pointing device 190. The typical computer device architecture 10 may further comprise a power supply (not shown) such as mains adapter, battery, or any combination thereof.

Figure 3:
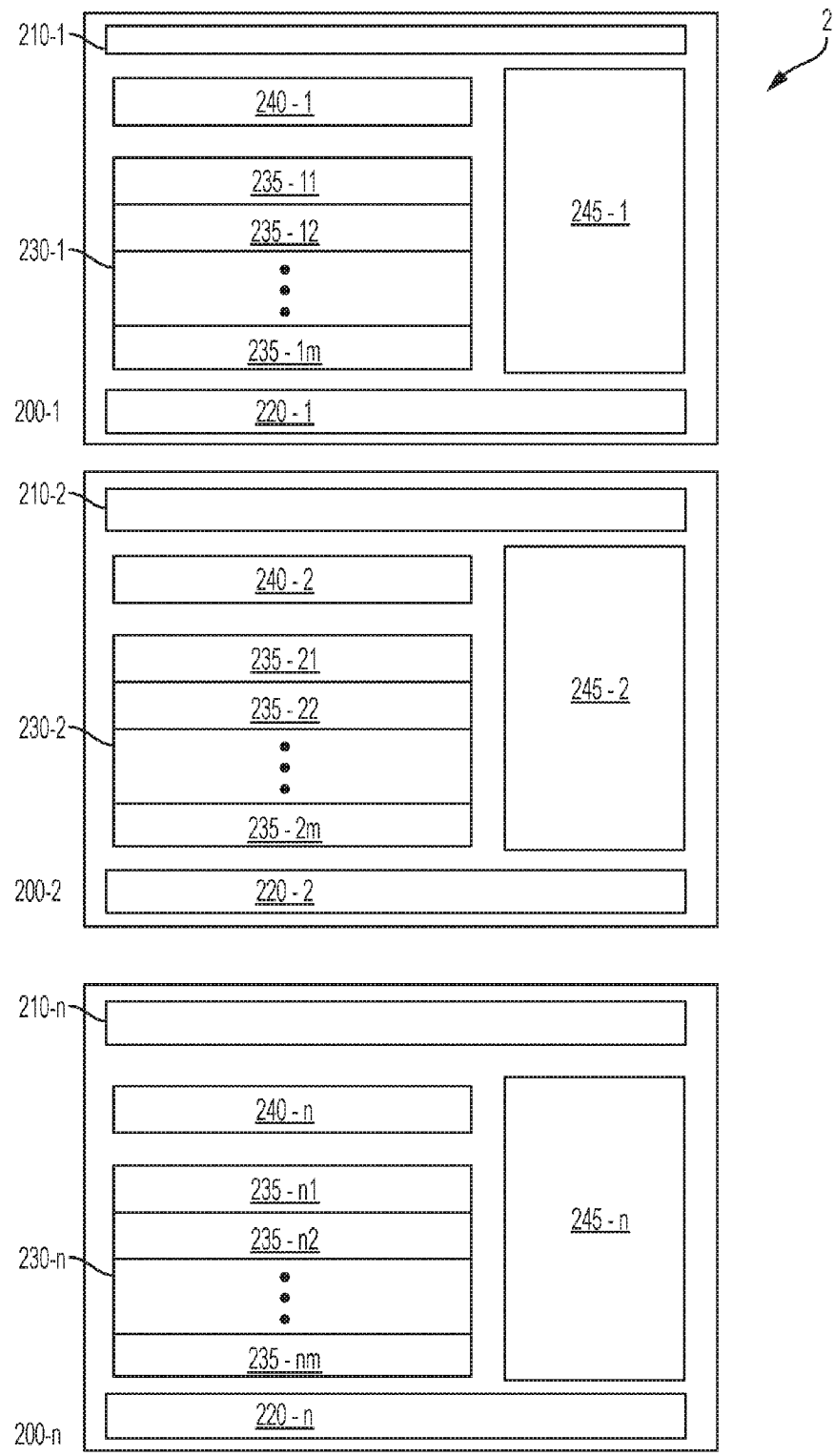
FIG. 3 shows typical search engine results 2 implementing the present invention.

FIG. 3 shows typical search engine results 2 implementing the present invention. The typical search engine results 2 may comprise a plurality of on-screen SERPs 200-1, . . . 200-$n$ comprising a first SERP 200-1, a second SERP 200-2 and subsequent SERP 200-$n$ generated by a search engine.

Each of the plurality of SERPs 200-1, . . . 200-$n$ may comprise a query section 210-1, . . . 210-$n$ for receiving one or more keywords and one or more search instructions from a user. As shown in FIG. 3, the query section 210-1, . . . 210-$n$ may be rectangular. It may extend partially or fully across the SERP 200-1, . . . 200-$n$. It may be arranged towards a top margin of the SERP 200-1, . . . 200-$n$.

Each of the plurality of SERPs 200-1, . . . 200-$n$ may comprise a navigation section 220-1, . . . 220-$n$ for receiving navigational instructions from the user, such as a plurality of on-screen buttons each of which being assigned on one of the plurality of SERPs 200-1, . . . 200-$n$. As shown in FIG. 3, the navigation section 220-1, . . . 220-$n$ may be rectangular. It may extend partially or fully across the SERP 200-1, . . . 200-$n$. It may be arranged towards a bottom margin of the SERP 200-1, . . . 200-$n$.

Each of the plurality of SERPs 200-1, . . . 200-$n$ may comprise an organic search result section 230-1, . . . 230-$n$ for displaying one or more organic search results to the user. As shown in FIG. 3, the organic search result section 230-1, . . . 230-$n$ may be rectangular. It may extend partially or fully along the SERP 200-1, . . . 200-$n$. It may be arranged towards a left margin of the SERP 200-1, . . . 200-$n$. The organic search result section 230-1, . . . 230-$n$ may comprise a plurality of individual organic search result sections 235-11, . . . 235-1$m$, 235-21, . . . 235-2$m$, 235-$n$1, . . . 235-$nm$ comprising a first individual organic search result section 235-11, 235-21, . . . 235-$n$1, a second individual organic search result section 235-12, 235-22, . . . 235-$n$2, and subsequent individual organic search result sections 235-1$m$, 235-2$m$, 235-$nm$. The plurality of organic search result sections 230-1, . . . 230-$n$ may have different numbers m of individual organic search result sections 235-11, . . . 235-1$m$, 235-21, . . . 235-2$m$, 235-$n$1, . . . 235-$nm$. The search engine may rank the organic search results according to their relevance to the one or more keywords. The search engine may assign to each of the individual organic search result sections 235-11, . . . 235-1$m$, 235-21, . . . 235-2$m$, 235-$n$1, . . . 235-$nm$ one of the organic search results. Thus, a most relevant organic search result may be assigned to the first individual organic search result section 235-11 on the first SERP 200-1, a second most relevant organic search result may be assigned to the second individual organic search result section 235-12 on the first SERP 200-1, an m-th most relevant organic search result may be assigned to the m-th individual organic search result section 235-1$m$ on the first SERP 200-1, an (m+1)-th most relevant organic search result may be assigned to the first individual organic search result section 235-21 on the second SERP 200-2, and so on.

Traffic resulting from searches generally divides into, on the first SERP 200-1, 10% for the most relevant organic search result, 8% for the second most relevant organic search result, 6% for the third most relevant organic search result, 3% for the fourth most relevant organic search result, . . . 0.5% for the tenth most relevant organic search result, on the second SERP 200-2, 0.05% for the eleventh most relevant organic search result.

Performance potentials are generally, on the first SERP 200-1, 0% for both the most relevant organic search result and the second most relevant organic search result, in case of a navigational keyword 0% or in case of a transactional or informational keyword 10% for both the third and fourth most relevant organic search results, 15% for both the fifth and sixth most relevant organic search results, 25% for each of the seventh, eighth, ninth and tenth most relevant organic search results, and on the second SERP 200-2, 500% for both the eleventh and twelfth organic search results, i. e. a move from the second SERP 200-2 to the first SERP 200-1.

Each of the plurality of SERPs 200-1, . . . 200-n may comprise one more sponsored search result sections 240-1, . . . 240-n for displaying one or more sponsored search results to the user. As shown in FIG. 3, the sponsored search result sections 240-1, . . . 240-n may be rectangular. They may extend partially or fully along the SERP 200-1, . . . 200-n. As shown in FIG. 3, the search result sections 240-1, . . . 240-n may be arranged towards the left margin of the SERP 200-1, . . . 200-n, or the right margin, for example.

Each of the plurality of SERPs 200-1, . . . 200-n may comprise one or more integration sections 245-1, . . . 245-n for displaying one or more search engine integrations, i. e. additional contents compiled and/or provided by the search engine, to the user. As shown in FIG. 3, the integration sections 245-1, . . . 245-n may be rectangular. They may extend partially or fully along the SERP 200-1, . . . 200-n. As shown in FIG. 3, the integration sections 245-1, . . . 245-n may be arranged towards the right margin of the SERP 200-1, . . . 200-n, or the left margin, for example.

Figure 4:
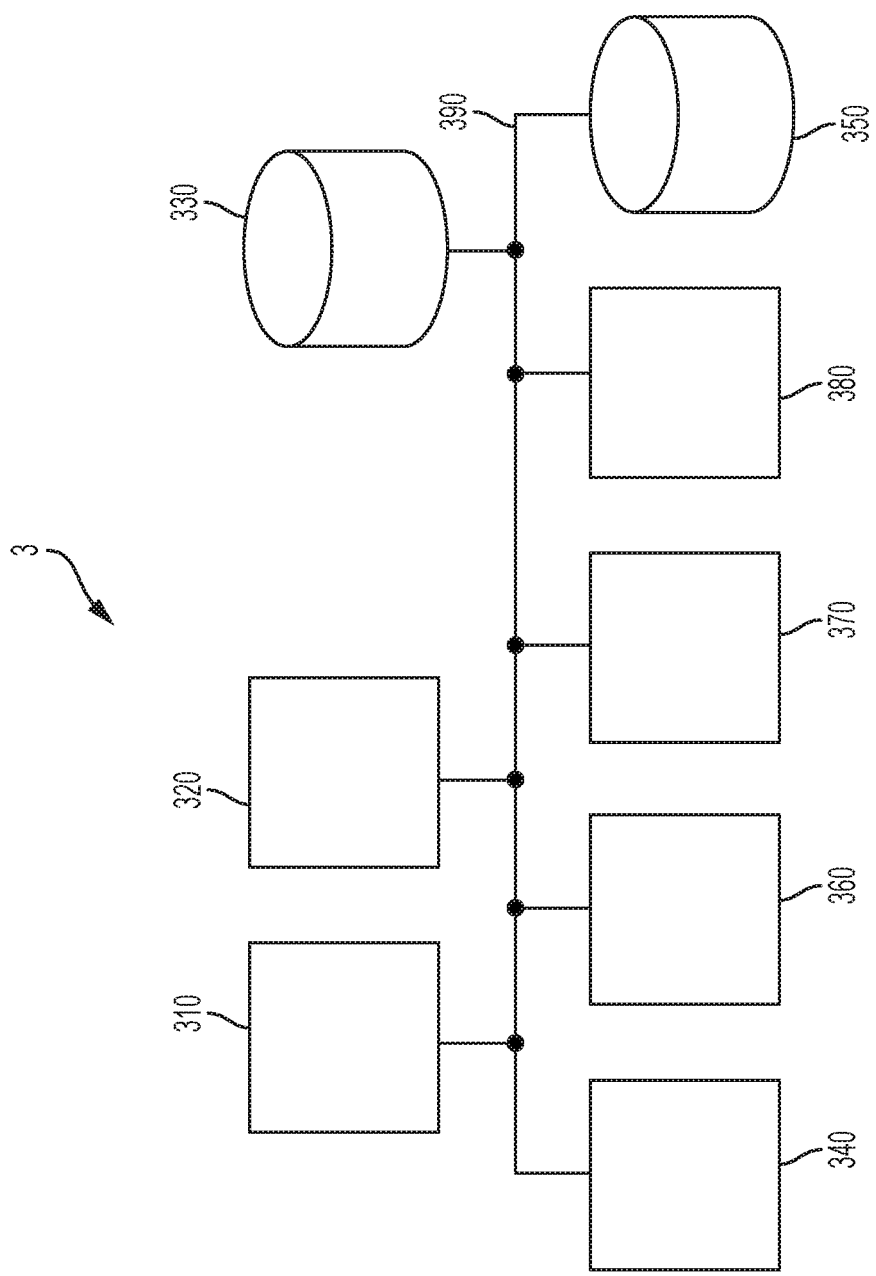
FIG. 4 shows a search query classification architecture 3 implementing the present invention.

FIG. 4 shows a search query classification architecture 3 implementing the present invention. The search query classification architecture 3 may, for example, be implemented in a stand-alone search query classification system, a content management system (CMS) or research tool, such as online research tool. The search query classification architecture 3 may comprise a plurality of modules such as software modules, hardware modules, or any combination thereof. The plurality of modules may be executed on the one or more computing devices 10 such as server computing devices 20-1, . . . 20-n, or provided as a service, that may be implemented as a cloud service. The software modules may comprise programs such as machine code, or compiled or interpreted code. The hardware modules may comprise dedicated hardware such as ASICs and FPGAs. Two or more modules of the plurality of modules may be coupled to each other via one or more connections such as a module bus 390.

The search query classification architecture 3 may comprise a search results module 310. The search results module 310 may automatically obtain, from the network, one or more search results for each of a plurality of search queries; and store the one or more search results of each of the plurality of search queries. The one or more search results of each of the plurality of search queries may comprise at least one of: one or more titles of one or more resources; one or more identifiers to one or more resources; and one or more integrations supplemented to the one or more search results.

The search query classification architecture 3 may comprise a resource contents module 320. The resource contents module 320 may automatically acquire a plurality of resources. The resources may, for example, be Wikipedia articles and be acquired from Wikipedia.org, or an open repository of web crawl data such as CommonCrawl.org. Each of the plurality of resources may comprise a resource title and resource corpus.

The search query classification architecture 3 may comprise a data base module 330. The data base module 330 may automatically store the plurality of resources and pluralities of search results as pre-stored plurality of resources and pluralities of search results, respectively. The data base module could store millions of keywords or search results, for example 800.000.000 keywords or search results.

The search query classification architecture 3 may comprise a processing module 340. The processing module 340 may, prior to classifying the plurality of search queries into the two or more categories, automatically modify at least one of the plurality of search queries, for example, by deleting a term, word, filler word, nuisance word or stop-word; or modify at least one of the plurality of search queries by replacing a term with a modified term or basic term corresponding to the term. The deleted term may be an irrelevant term or common term such as "a", "the", "be" and "and" and/or general term such as "Wikipedia". The processing module 340 may, prior to classifying the plurality of search queries into the two or more categories, automatically process one or more titles of one or more resources; or process one or more identifiers to one or more resources. The processing module 340 may classify the plurality of search queries into two or more categories. Classifying a plurality of search queries into two or more categories may comprise applying one or more predetermined rules to each of the plurality of search queries, wherein the one or more predetermined rules may be indicative of the two or more categories and each of the plurality of search queries may be associated with one or more search results in the network. Classifying a plurality of search queries into two or more categories may comprise determining, for each of the plurality of search queries, one or more similarity values indicating similarity to each of the two or more categories based on the applied one or more predetermined rules.

The two or more categories may comprise at least one of one or more main categories; and, more specifically, one or more user intent categories. The one or more user intent categories may comprise at least one of an informational category; a navigational category; and a transactional category. The two or more categories may comprise at least one of one or more sub categories; and, more specifically, one or more buying cycle categories. The one or more buying cycle categories comprise at least one of an awareness category; a consideration category; a purchase category; and a retention category.

The search query classification architecture 3 may comprise a rule module 350. The rule module 350 may automatically store the one or more predetermined rules. The one or more predetermined rules may comprise at least one of one or more informational rules; one or more navigational rules; and one or more transactional rules. The rules may, for example, be based on the characteristics specified in "5. Results" of Jansen Bernard J., Booth Danielle L., Spink Amanda mentioned above. Thus, the one or more informational rules may comprise at least one of query comprises one or more question words; query comprises one or more natural language terms; query comprises one or more informational terms; query is subsequent query; query resulted in viewing of more than one search result; query comprises more than two terms; and query that does not match navigational rule or transactional rule. The one or more navigational rules may comprise at least one of query comprises name, company name, business name, organization name or personal name; query comprises one or more domain suffixes; query with "web" as the source; query comprises less than three terms; and query resulted in viewing of first search engine results page. The one or more transactional rules may comprise at least one of query comprises one or more terms relating to at least one of movies, songs, lyrics, recipes, images, humor and porn; query comprises one or more terms relating to obtainment; query comprises one or more terms relating to download; query relates to at least one of an image collection, and audio collection or a video collection; query with "audio", "images", or "video" as the source; query comprises one or more terms relating to entertainment; query comprises one or more terms relating to at least one of interaction, buying and chatting; query comprises one or more terms relating to movies, songs, lyrics, images; and query comprises at least one of multimedia file extension and compression file extension.

The search query classification architecture 3 may comprise a machine learning module 370. The machine learning module 370 may comprises at least one of a neural network, deep neural network, convolutional neural network, linear model and generalized boosted model.

The search query classification architecture 3 may comprise a training module 360. The training module 360 may automatically convert the plurality of classified search queries and the at least one of the respective one or more similarity values into a plurality of training sets. Each of the plurality of training sets may comprise a plurality of numbers; or a vector. The training module 360 may train the machine learning module 370. Train the machine learning module 370 may comprise applying the machine learning module to a plurality of training sets, wherein each of the plurality of training sets is based on one of the plurality of classified search queries and at least one of the respective one or more similarity values. The at least one of the respective one or more similarity values may be a highest similarity value within the respective one or more similarity values.

Thus, the search query classification architecture 3 may be trained to process a new, i. e. "unseen", search query and classify it into the two or more categories. As a result, search query classification architecture 3 improves generalization and avoids overfitting.

The search query classification architecture 3 may comprise a classification module 380. The classification module 380 may automatically classify the search query into a category of the two or more categories. Classifying the search query into a category of the two or more categories may comprise applying the trained machine learning module to the search query; and obtaining the category classifying the search query from the trained machine learning module 370.

A user, for example content strategist, content marketing manager, online marketing manager, editor, chief editor, freelancer, writer or owner of a small business, of the client computing device may have a search query, or even a large plurality of search queries, automatically classified. The classification may be based on pre-processed, i. e. pre-acquired and pre-stored, information. Thus, the search query classification architecture 3 may classify the keyword, or search query, while the user is managing resource contents, i. e. in real time.

Figure 5:
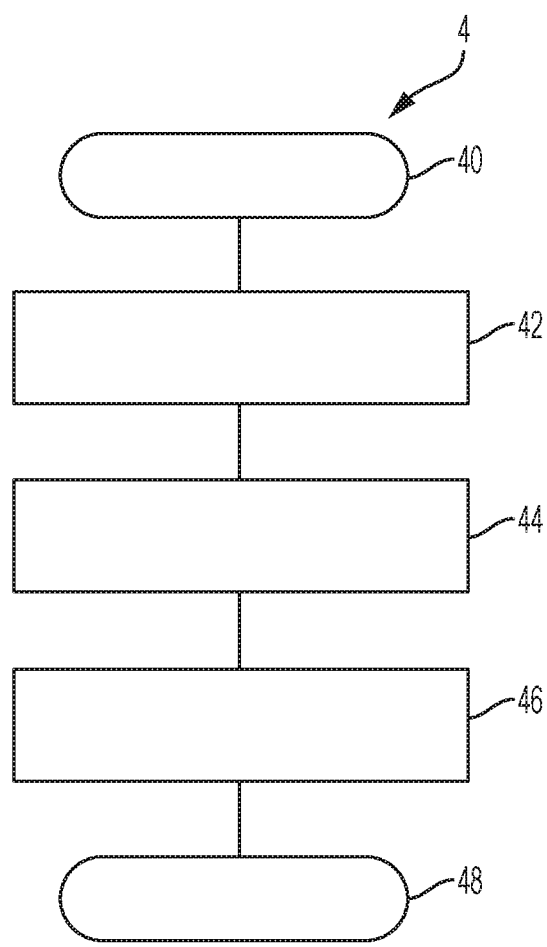
FIG. 5 shows a flow chart of an overall process 4 for classifying search queries in a network according to an embodiment of the present invention.

FIG. 5 shows a flow chart of an overall process 4 for classifying search queries in a network according to an embodiment of the present invention.

The overall process 4 for classifying the search queries in the network starts at step 40.

Following step 40, the overall process 4 comprises step 42. In step 42, the overall process 4 may classify the plurality of search queries into two or more categories.

Following step 42, the overall process 4 comprises step 44. In step 44, the overall process 4 may automatically train, based the plurality of classified search queries and the respective one or more similarity values, the machine learning module 370.

Following step 44, the overall process 4 comprises step 46. In step 46, the overall process 4 may automatically classify, using the trained machine learning module 370, the search query into a category of the two or more categories.

The overall process 4 for classifying the search query in the network ends at step 48.

Thus, the machine learning module 370 is trained on the classified search queries, not on the rule, in order to avoid overfitting and improve generalization of "unseen" search queries to be classified after the training. After the training, the unseen queries may be classified without need for access to user-related click data and/or user search logs.

Figure 6:
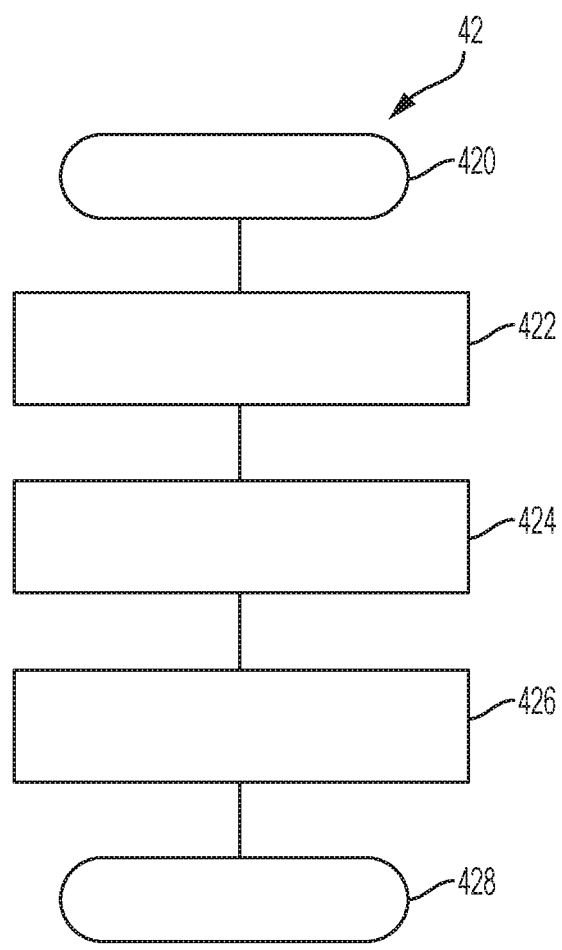
FIG. 6 shows a flow chart of a pre-process 42 for classifying search queries in a network according to an embodiment of the present invention.

FIG. 6 shows a flow chart of a pre-process 42 for classifying search queries in a network according to an embodiment of the present invention.

The pre-process 42 for classifying the search queries in the network starts at step 420.

Following step 420, the pre-process 42 comprises step 422. In step 422, the pre-process 42 may automatically obtain, from the network, the one or more search results for each of the plurality of search queries; and store the one or more search results of each of the plurality of search queries.

Following step 422, the pre-process 42 comprises step 424. In step 424, the pre-process 4 may automatically modify at least one of the plurality of search queries.

Following step 424, the pre-process 42 comprises step 426. In step 426, the pre-process 4 may automatically classify, applying the one or more predetermined rules, the plurality of search queries into two or more categories.

The pre-process 42 for classifying the search query in the network ends at step 428.

Figure 7:
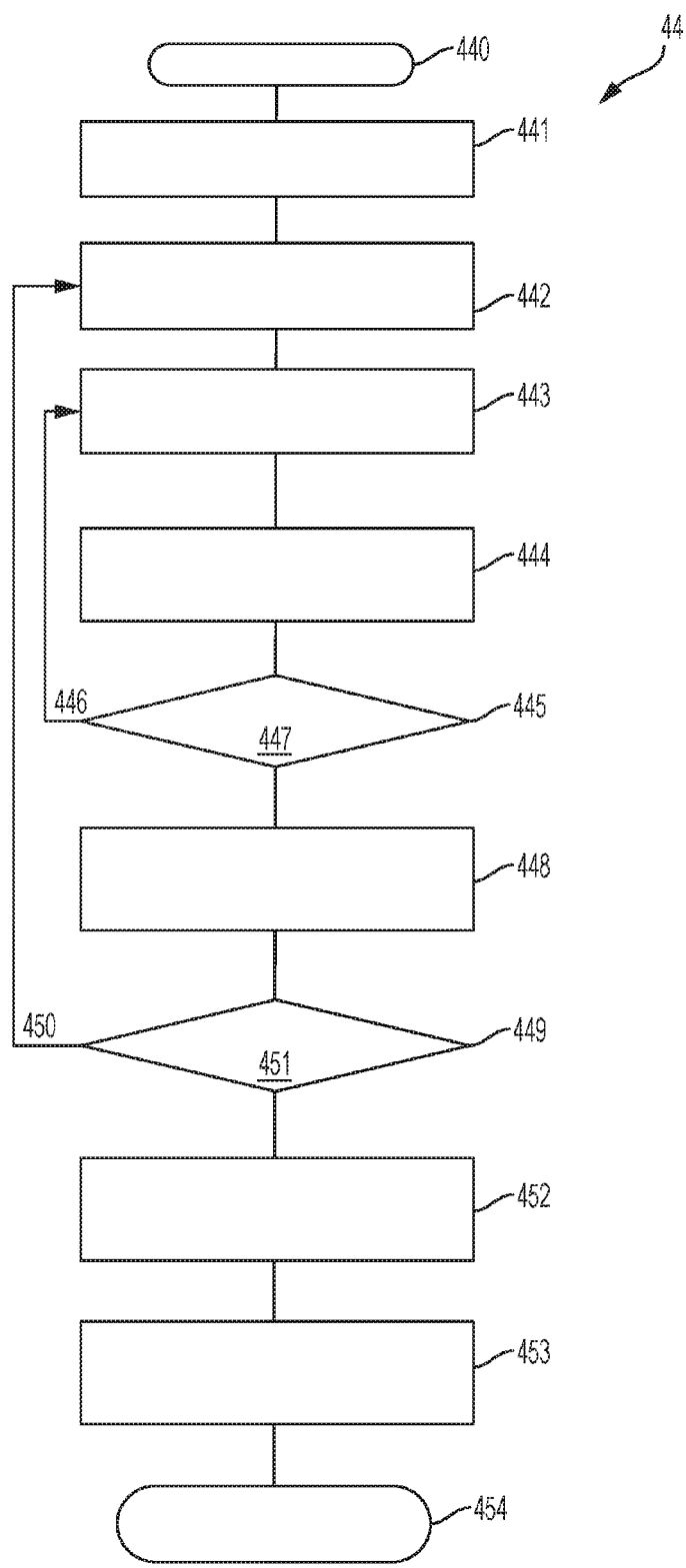
FIG. 7 shows a simplified flow chart of a training process 44 for classifying search queries in a network according to an embodiment of the present invention.

FIG. 7 shows a simplified flow chart of a training process 44 for classifying search queries in a network according to an embodiment of the present invention;

The training process 44 for classifying the search queries in the network starts at step 440. During the training process 44 the plurality of training sets, each of which being based on one of the plurality of classified search queries and at least one of the respective one or more similarity values, is applied to the machine learning module 370 in order to train the machine learning module 370.

Following step 440, the training process 44 comprises step 441. In step 441, the training process 44 may automatically modify one or more of the plurality of classified search queries in order to clean the plurality of training set and/or avoid overfitting.

Following step 441, the training process 44 comprises step 442. In step 442, the training process 44 may automatically obtain a training set such as classified search query from the plurality of training sets.

Following step 442, the training process 44 comprises step 443. In step 443, the training process 44 may automatically obtain a predetermined rule from the one or more predetermined rules.

Following step 443, the training process 44 comprises step 444. In step 444, the training process 44 may automatically apply the obtained predetermined rule to the obtained training set and determine similarity of the obtained training set to the two or more categories. The training process 44 may determine respective similarity values.

Following step 444, the training process 44 comprises step 445. In step 445, the training process 44 may automatically determine whether all of the predetermined rules have been applied to the obtained training set. In case that not all of the predetermined rules have already been applied to the obtained training set 446, the process 44 returns to step 443 in order to obtain another predetermined rule. In case that all of the predetermined rules have already been applied to the obtained training set 447, the process 44 progresses to step 448.

Following step 445, the training process 44 comprises step 448. In step 448, the training process 44 may automatically evaluate similarity of the obtained training set to the two or more categories and determine one of the two or more categories in order to classify the obtained training set.

Following step 448, the training process 44 comprises step 449. In step 449, the training process 44 may automatically determine whether all of the training sets have been obtained. In case that not all of the training sets have already been obtained 450, the process 44 returns to step 442 in order to obtain another training set. In case that all of the training sets have already been obtained 451, the process 44 progresses to step 452.

Following step 449, the training process 44 comprises step 452. In step 452, the training process 44 may automatically convert the training sets and similarity values into numbers or vectors within ranges suitable for training the machine learning module 370.

Following step 452, the training process 44 comprises step 453. In step 443, the training process 44 may automatically apply the machine learning module 370 to the plurality of training sets in order to train the machine learning module 370. During the training, the machine learning module 370 adapts itself to the plurality of training sets.

The training process 44 for classifying the search query in the network ends at step 454.

Figure 8:
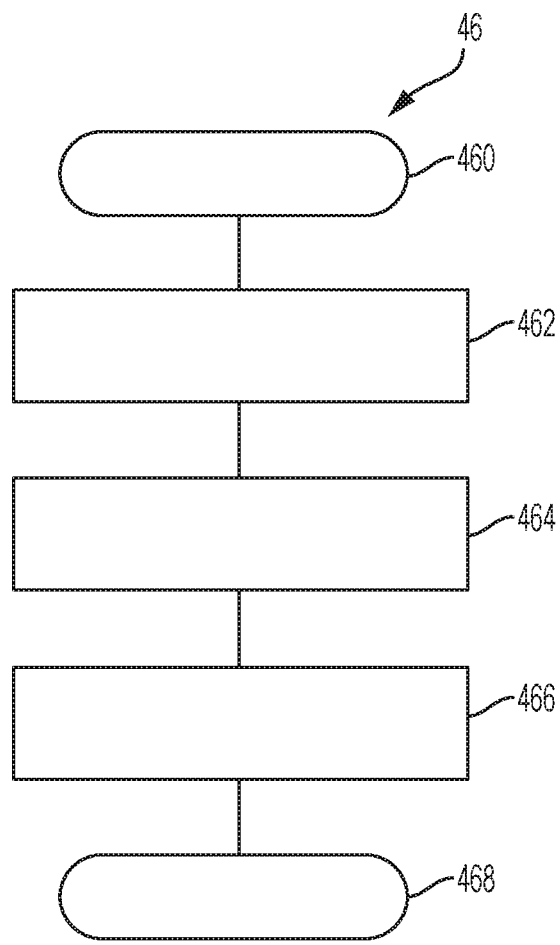
FIG. 8 shows a flow chart of a classification process 46 for classifying search queries in a network according to an embodiment of the present invention.

FIG. 8 shows a flow chart of a classification process 46 for classifying search queries in a network according to an embodiment of the present invention.

The classification process 46 for classifying search queries in the network starts at step 460. In step 460, the process 46 may require user authentication from a user. The user authentication may be implemented as single-factor authentication, two-factor authentication or multi-factor authentication, for example.

Following step 460, the process 46 comprises step 462. In step 462, the classification process 46 may comprise receiving an unseen search query to be classified.

Following step 462, the classification process 46 comprises step 464. In step 464, the process 46 may comprise automatically classify the unseen search query into a category of the two or more categories. Classify the unseen search query may comprise applying the trained machine learning module 370 to the search query; and obtaining the category classifying the search query from the trained machine learning module 370.

Following step 464, the classification process 46 comprises step 466. In step 466, the classification process 46 may comprise outputting the obtained category.

The classification process 46 for classifying search queries in the network ends at step 468.

Figure 9:
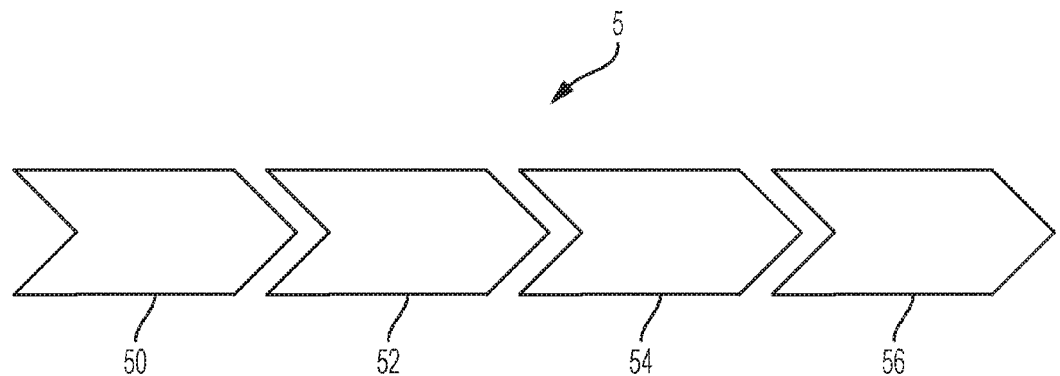
FIG. 9 shows a representation 5 of an exemplary customer journey.

FIG. 9 shows a representation 5 of an exemplary customer journey.

When committing to a product or service, a customer usually progresses through a plurality of stages, comprising awareness 50, consideration 52, purchase 54 and retention 56. As the process is repeated for new products and services, it is known as buying cycle. However, search queries of the customer, i. e. a user of a search engine, are indicative of the customer's present stage in the buying cycle. Thus, it is vital to correctly identify, i. e. classify the present stage of the buying cycle. During awareness 50, users make themselves aware of the market. During consideration 52, the users consider to buy a product or service and compare offers on the market. During purchase 54, the users want to buy the product or service. During retention 56, some extras may be needed or after-sales, i. e. after-purchase, problems may need to be fixed.

Figure 10:
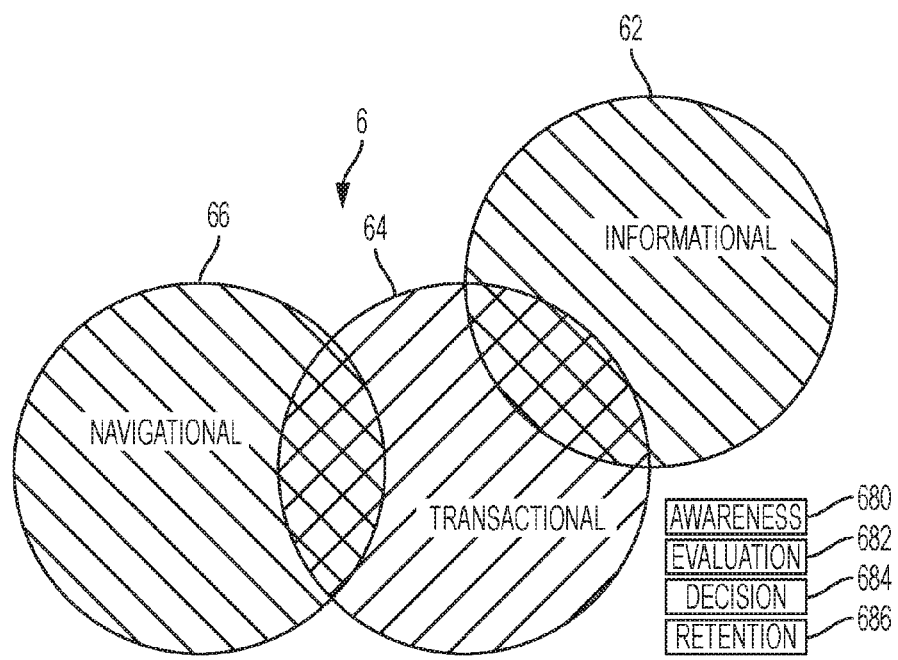
FIG. 10 shows a simplified Venn diagram 6 of exemplary categories of search queries according to an embodiment of the present invention.

FIG. 10 shows a simplified Venn diagram 6 of exemplary categories of search queries according to an embodiment of the present invention.

The exemplary categories of search queries comprise a plurality of user intent categories, as main categories, and a plurality of buying cycle categories, as sub categories. The plurality of user intent categories comprises an informational category 62, a transactional category 64 and a navigational category 66. The plurality of buying cycle categories comprises an awareness category 680, a consideration category 682, a purchase category 684 and a retention category 686.

While the transactional category 64 and the buying cycle categories 680, 682, 684, 686 appear to relate generally to a user committing to a product or service, search queries such as "how to repair xy" may relate to the informational category 62 and the retention category 686, for example. However, the classification of a search query according to the present invention provides for a meaningful classification.

Figure 11:
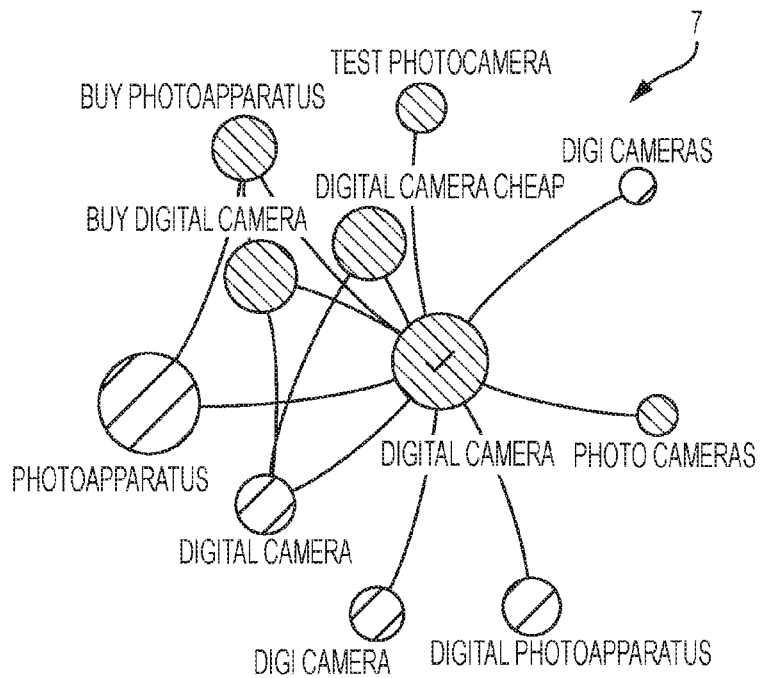
FIG. 11 shows an exemplary topic graph of exemplary search queries illustrating an exemplary classification of a user search indent according to the present invention.

FIG. 11 shows an exemplary topic graph of exemplary search queries illustrating an exemplary classification of a user search indent according to the present invention.

The exemplary search queries comprise a plurality of transactional search queries including "digitalcamera", "digital camera cheap", "buy digital camera", "photo cameras", "test photocamera" and "buy photoapparatus", and a plurality of informational search queries including "digi camera", "digi cameras", "digital camera", "digital photoapparatus" and "photoapparatus". Each of the exemplary search queries has been automatically classified according to the present invention, and patterned according to the plurality of informational search queries or plurality of transactional search queries to which it belongs to.

Figure 12:
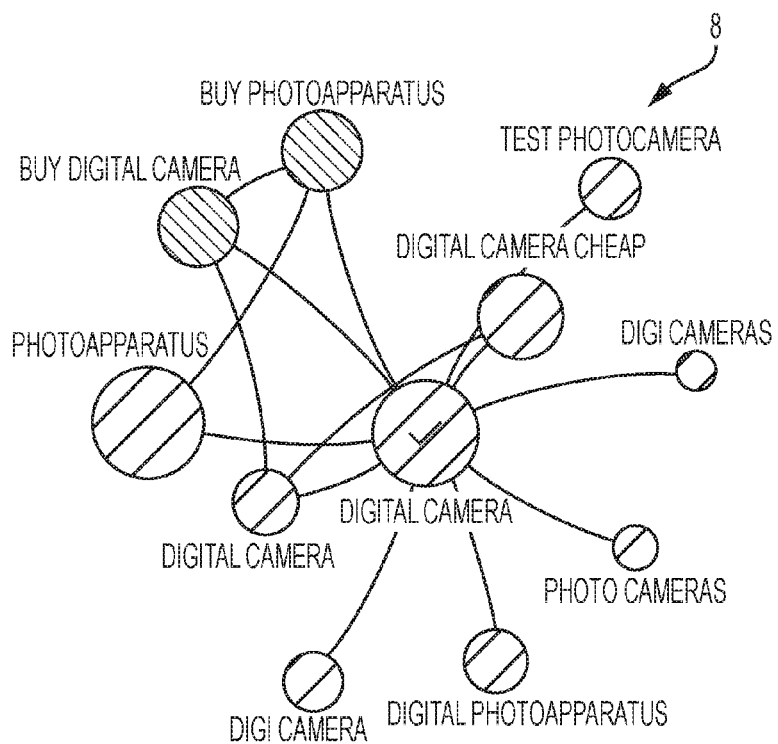
FIG. 12 shows an exemplary topic graph of exemplary search queries illustrating an exemplary classification of a buying cycle according to an embodiment of the present invention.

FIG. 12 shows an exemplary topic graph of exemplary search queries illustrating an exemplary classification of a buying cycle according to an embodiment of the present invention.

The plurality of search queries comprise a plurality of consideration search queries including "digitalcamera", "digital camera", "digi camera", "digi cameras", "digital camera cheap", "photo cameras", "test photocamera", "photoapparatus" and "digital photoapparatus", and a plurality of decision search queries including "buy digital camera" and "buy photoapparatus". Each of the exemplary search queries has been automatically classified according to the present invention, and patterned according to the plurality of consideration search queries or plurality of decision search queries to which it belongs to.

The embodiments described herein are exemplary and explanatory, and are not restrictive of the invention as defined in the claims.

The invention claimed is:

1. A computer-implemented method of classifying a search query in a network, the method comprising:
    obtaining, from the network, at least one search result for each of a plurality of search queries, wherein the plurality of search queries includes at least one unseen search query;
    modifying at least one of the plurality of search queries comprising at least one unseen search query;
    with a processing module, executing on one or more computing devices, automatically:
        classifying the plurality of search queries into one or more categories, the classifying comprising:
            applying one or more predetermined rules to each of the plurality of search queries, wherein the one or more predetermined rules are indicative of the one or more categories and each of the plurality of search queries is associated with one or more search results in the network;

determining, for each of the plurality of search queries, one or more similarity values indicating similarity to each of the one or more categories based on the applied one or more predetermined rules;

with a training module, executing on one or more computing devices, automatically:

training a machine learning module using the classified search queries including the at least one unseen search query, the training comprising:

modifying at least one of the plurality of classified search queries in order to change a plurality of training sets to be applied to the training module;

obtaining a training set from the plurality of training sets;

obtaining each predetermined rule from the one or more predetermined rules;

applying the each predetermined rule to the training set to determine a similarity of the training set to the one or more categories;

evaluating the similarities for the training set to the one or more categories to classify the training set, wherein each training set is classified to the one or more categories;

converting each of the plurality of training sets and associated similarity values into a number or a vector;

determining whether the each of the plurality of training sets is within a range suitable for the machine learning module;

applying the machine learning module to the plurality of training sets, wherein the each of the plurality of training sets is based on one of the plurality of classified search queries and at least one of the respective one or more similarity values receiving the at least one unseen search query; and classifying the at least one unseen search query into a category of the one or more categories by applying the trained machine learning module.

2. The method of claim 1, wherein:
the two or more categories comprise at least one of:
one or more main categories; and
one or more user intent categories.

3. The method of claim 2, wherein:
the one or more user intent categories comprise at least one of:
an informational category;
a navigational category; and
a transactional category.

4. The method of claim 1, wherein:
the one or more predetermined rules comprise at least one of:
one or more informational rules;
one or more navigational rules; and
one or more transactional rules.

5. The method of claim 4, wherein:
the one or more informational rules comprise at least one of:
query comprises one or more question words;
query comprises one or more natural language terms;
query comprises one or more informational terms;
query is subsequent query;
query resulted in viewing of more than one search result;
query comprises more than two terms; and
query that does not match navigational rule or transactional rule;

the one or more navigational rules comprise at least one of:
query comprises name, company name, business name, organization name or personal name;
query comprises one or more domain suffixes;
query with "web" as the source;
query comprises less than three terms; and
query resulted in viewing of first search engine results page; or the one or more transactional rules comprise at least one of:
query comprises one or more terms relating to at least one of movies, songs, lyrics, recipes, images, humor and porn;
query comprises one or more terms relating to obtainment;
query comprises one or more terms relating to download;
query relates to at least one of an image collection, and audio collection or a video collection;
query with "audio", "images", or "video" as the source;
query comprises one or more terms relating to entertainment;
query comprises one or more terms relating to at least one of interaction, buying and chatting;
query comprises one or more terms relating to movies, songs, lyrics, images; and
query comprises at least one of multimedia file extension and compression file extension.

6. The method of claim 1, wherein:
the two or more categories comprise at least one of:
one or more sub categories; and
one or more buying cycle categories.

7. The method of claim 6, wherein:
the one or more buying cycle categories comprise at least one of:
an awareness category;
a consideration category;
a purchase category; and
a retention category.

8. The method of claim 1, wherein:
the one or more search results of each of the plurality of search queries comprise at least one of:
one or more titles of one or more resources;
one or more identifiers to one or more resources; and
one or more integrations supplemented to the one or more search results.

9. The method of claim 1, wherein:
the at least one of the respective one or more similarity values is a highest similarity value within the one or more similarity values.

10. The method of claim 1, wherein:
the machine learning module comprises at least one of a neural network, deep neural network, convolutional neural network, linear model and generalized boosted model.

11. The method of claim 1, further comprising:
with a search results module, executing on one or more computing devices, automatically:
obtaining, from the network, the one or more search results for each of the plurality of search queries; and storing the one or more search results of each of the plurality of search queries.

12. The method of claim 1, further comprising:
with the processing module, prior to classifying the plurality of search queries into the two or more categories, automatically:
modifying at least one of the plurality of search queries by deleting a term, word, filler word, nuisance word or stopword;
modifying at least one of the plurality of search queries by replacing a term with a modified term or basic term corresponding to the term;
processing one or more titles of one or more resources; or
processing one or more identifiers to one or more resources.

13. The method of claim 1, wherein:
each of the plurality of training sets comprises:
a plurality of numbers; or
a vector.

14. The method of claim 1, further comprising:
with the training module, prior to training the machine learning module, automatically:
converting the plurality of classified search queries and the at least one of the respective one or more similarity values into the plurality of training sets.

15. A system for classifying a search query, the system comprising:
one or more processors, when executing on one or more computing devices:
being suitable for performing the method of claim 1.

16. A computing device for classifying a search query, the computing device comprising:
one or more processors, configured to perform operations; and
a memory, coupled to the one or more processors and comprising instructions to cause, when executing on the one or more processors, the computing device to perform operations, comprising:
obtaining, from the network, at least one search result for each of a plurality of search queries, wherein the plurality of search queries includes at least one unseen search query;
modifying at least one of a plurality of search queries comprising at least one unseen search query;
classifying the plurality of search queries into one or more categories, the classifying comprising:
applying one or more predetermined rules to each of the plurality of search queries, wherein the one or more predetermined rules are indicative of the one or more categories and each of the plurality of search queries is associated with one or more search results in the network;
determining, for each of the plurality of search queries, one or more similarity values indicating similarity to each of the one or more categories based on the applied one or more predetermined rules;
training a machine learning module using the classified search queries including the at least one unseen search query, the training comprising:
modifying at least one of the plurality of classified search queries in order to change a plurality of training sets to be applied to the training module;
obtaining a training set from the plurality of training sets;
obtaining each predetermined rule from the one or more predetermined rules;
applying the each predetermined rule to the training set to determine a similarity of the training set to the one or more categories;
evaluating the similarities for the training set to the one or more categories to classify the training set, wherein each training set is classified to the one or more categories;
converting each of the plurality of training sets and associated similarity values into a number or vector;
determining whether the each of the plurality of training sets is within a range suitable for the machine learning module;
applying the machine learning module to a plurality of training sets, wherein each of the plurality of training sets is based on one of the plurality of classified search queries and at least one of the respective one or more similarity values;
receiving the at least one unseen search query; and
classifying the at least one unseen search query into a category of the one or more categories by applying the trained machine learning module.

17. The computing device of claim 16, wherein:
the two or more categories comprise at least one of:
one or more main categories; and
one or more user intent categories.

18. The computing device of claim 16, wherein:
the one or more user intent categories comprise at least one of:
an informational category;
a navigational category; and
a transactional category.

19. A non-transitory computer-readable storage medium comprising instructions causing a system to perform operations for classifying a search query, the operations being suitable for performing the method of claim 1.

* * * * *